United States Patent [19]
Kumar

[11] Patent Number: 5,785,298
[45] Date of Patent: Jul. 28, 1998

[54] PROPORTIONAL SOLENOID-CONTROLLED FLUID VALVE ASSEMBLY

[75] Inventor: Viraraghavan S. Kumar, Palm Bay, Fla.

[73] Assignee: Teknocraft, Inc., West Melbourne, Fla.

[21] Appl. No.: 632,137

[22] Filed: Apr. 15, 1996

[51] Int. Cl.⁶ ................................................ F16K 31/02
[52] U.S. Cl. .................... 251/129.16; 251/129.18; 335/279
[58] Field of Search ............ 251/129.15, 129.16, 251/129.18; 335/261, 279, 281

[56] References Cited

U.S. PATENT DOCUMENTS

| | | | |
|---|---|---|---|
| 3,250,293 | 5/1966 | Adams . | |
| 3,368,791 | 2/1968 | Wells | 251/129.16 X |
| 3,900,822 | 8/1975 | Hardwick et al. | 335/268 |
| 4,442,998 | 4/1984 | Ohyama et al. | 251/282 |
| 4,463,332 | 7/1984 | Everett | 335/258 |
| 4,633,209 | 12/1986 | Belbel et al. | 335/279 X |
| 4,635,683 | 1/1987 | Nielsen | 137/625.65 |
| 4,767,097 | 8/1988 | Everett et al. | 251/129.08 |
| 4,954,799 | 9/1990 | Kumar | 335/236 |
| 5,010,312 | 4/1991 | Motykiewicz | 335/279 X |
| 5,064,166 | 11/1991 | Schechter | 251/129.15 |
| 5,066,980 | 11/1991 | Schweizer | 335/281 X |
| 5,110,087 | 5/1992 | Studtmann et al. | 251/129.16 |
| 5,218,999 | 6/1993 | Tanimoto | 251/129.15 X |
| 5,240,227 | 8/1993 | Sich | 251/129.16 |
| 5,301,921 | 4/1994 | Kumar | 251/129.08 |
| 5,407,174 | 4/1995 | Kumar | 251/129.08 |
| 5,417,373 | 5/1995 | Facchin | 251/129.16 X |
| 5,516,076 | 5/1996 | Stobbs et al. | 251/129.16 |

FOREIGN PATENT DOCUMENTS

| 2020787 | 10/1994 | Canada . |
|---|---|---|
| 0 204 293 | 3/1985 | European Pat. Off. . |

*Primary Examiner*—John Rivell
*Attorney, Agent, or Firm*—Charles E. Wands

[57] ABSTRACT

A proportional solenoid-driven valve control assembly contains a moveable, magnetic armature positioned adjacent to one end of a fixed pole piece that protrudes from a solenoid bore and is supported by means of a compact suspension spring arrangement adjacent to the one end of the bore. The movable armature is configured to provide two radial magnetic flux paths. One flux path traverses a fixed radial shunt gap at one end of fixed magnetic pole piece that is located in and protrudes from the one end of the solenoid bore. The other flux path traverses a variable geometry reluctance gap defined between a radially projecting, tapered rim portion of the armature and an inwardly projecting tapered portion of the solenoid assembly housing. The proportional solenoid assembly is mechanically coupled with a valve unit for electrically controlling its operation, in particular the flow of fluid between a fluid input port and a fluid exit port of the valve unit, in accordance with displacement of the movable armature along the solenoid assembly axis in proportion to the current applied to the solenoid.

33 Claims, 4 Drawing Sheets

PROPORTIONAL SOLENOID-CONTROLLED FLUID VALVE ASSEMBLY

FIELD OF THE INVENTION

The present invention relates in general to solenoid-operated fluid control valves for use in precision fluid flow regulation systems, for example of the type that require precise regulation of the rate of flow of a fluid, such as pneumatic or hydraulic regulation, and is particularly directed to the configuration of a new and improved solenoid-driven valve control structure, through which the output force and axial displacement imparted by the solenoid to a spring-biased valve control mechanism, and thereby fluid flow through an associated fluid flow-regulating valve assembly, may be controlled so as to be proportional to the application of an electrical current to the solenoid.

BACKGROUND OF THE INVENTION

Precision fluid flow control devices, such as fuel supply units for aerospace systems and oxygen/air metering units employed in hospitals, as non-limiting examples, typically incorporate some form of solenoid-operated valve through which a desired proportional control of fluid flow (in response to a solenoid energization current) is effected. In addition to the requirement that fluid flow be substantially proportional to the current applied to the solenoid, it is also desired that hysteresis in the flow rate versus control current characteristic (which creates an undesirable dead band in the operation of the valve) be maintained within some minimum value.

For this purpose, one customary practice has been to physically support the solenoid's moveable armature within the bore of its surrounding drive coil by means of low friction bearings, such as Teflon rings. However, even with the use of such a material, the dead band current is still not insignificant (e.g. on the order of forty-five milliamps), which limits the degree of operational precision of the valve and thereby its application.

One proposal to deal with this physical contact-created hysteresis problem is to remove the armature support mechanism from within the bore of the solenoid coil (where the unwanted friction of the armature support bearings would be encountered) to an end portion of the coil, and to support the armature within the bore by way of a spring mechanism that is located outside of the solenoid coil. One example of such a valve configuration is found in the U.S. Pat. No. to Everett, 4,463,332, issued Jul. 31, 1984.

Pursuant to this patented design, the valve is attached to one end of an armature assembly that is supported for axial movement within the cylindrical bore of the solenoid coil and to provide a permanent ring magnet surrounding the solenoid. One end of the solenoid contains a ring and spring armature support assembly, which is located substantially outside the (high flux density) solenoid bore, and the position of which can be changed so as to adjust the axial magnetic flux gap within the bore and thereby the force applied to the valve. Disadvantageously, however, such a support structure requires a magnetic flux booster component, supplied in the patented design in the form of a permanent magnet.

Thus, although the objective of the scheme described in the Everett patent is to adjust magnetic permeance and maintain linearity in the operation of the valve to which the armature is attached, the configurations of both the overall solenoid structure and individual parts of the solenoid, particularly the ring spring armature assembly (which itself is a complicated brazed part) and the use of a permanent booster magnet, are complex and not easily manufacturable using low cost machining and assembly techniques, thereby resulting in a high price tag per unit.

Another prior art configuration, described in the U.S. Pat. No. 4,635,683, to Nielsen, locates the movable armature outside the bore by means of a plurality of spiral spring-shaped bearings, which support a solenoid bore-located movable return spring adjusting mechanism to which a movable armature is affixed. The support spring bearings are supported adjacent to opposite ends of the solenoid structure. Unfortunately, this structure is costly to manufacture, as it not only places a complicated and movable return spring structure in the interior of the solenoid bore, but requires precision attachment of the spring bearings at multiple spaced apart locations of the housing adjacent to opposite ends of the solenoid.

My U.S. Pat. No. 4,954,799 entitled: "Proportional Electropneumatic Solenoid-Controlled Valve," describes an improvement over the above designs employing a linear motion proportional solenoid assembly, in which a moveable armature is supported within the bore of solenoid, so that it may be intimately coupled with its generated electromagnetic field (and thereby obviate the need for a permanent magnet as in the Everett design, referenced above), and in which the force imparted to the movable armature is substantially constant, irrespective of the magnitude of an axial air gap between the armature and an adjacent magnetic pole piece.

My patented solenoid assembly comprises a generally cylindrically configured housing of magnetic material and containing a solenoid coil having a longitudinal coaxial bore. A fixed magnetic pole piece is inserted into one end of the solenoid bore and a movable armature assembly of magnetic material is supported within the opposite end of the bore and magnetically coupled with the fixed pole piece. A radial gap is formed between a first circumferential portion of the movable armature and an interior cylindrical wall portion of the housing, and an axial gap is formed between one end of the movable armature assembly and the adjacent pole piece.

Linear proportionality between armature displacement and applied coil current is effected by means of an auxiliary cylindrical pole piece region, located adjacent to the axial gap. The auxiliary cylindrical pole piece region is tapered so as to have a varying thickness in the axial direction, and serves to effectively 'shunt' a portion of the magnetic flux that normally passes across the axial gap between the armature assembly and the pole piece element to a path of low reluctance, which results in a 'linearizing' the force vs. air gap characteristic over a prescribed range of the axial air gap.

The movable armature is supported within the solenoid bore by means of a pair of thin, highly flexible annular cantilever-configured suspension spring members, which are respectively coupled to axially spaced apart portions of the movable armature. In one configuration, one spring is installed within the solenoid bore proper and the other is installed in a bore portion of the housing outside the solenoid bore. In another configuration, the can be installed outside the bore.

The solenoid mechanism may be used to control fluid flow by coupling the movable armature of the linearly proportional solenoid structure to a fluid valve assembly, such as one containing a chamber that is in fluid communication with an inlet port and an outlet port. A valve poppet may be attached to the armature assembly for controllably opening and closing off one end of a tube member that extends from the chamber to the outlet port in accordance with axial movement of the armature assembly by the application of electric current to the solenoid coil.

Now although my patented solenoid assembly enjoys precise linear operation (armature displacement/force versus applied solenoid current), as a result of the tapered/shunt configuration of the armature/pole piece assembly and the thin, flexible, cantilevered suspension spring configuration (making it possible to support the armature substantially within the core portion of the coil winding, where the generated flux density is highest, and thereby removing the need of a permanent magnet), it would be preferred to simplify the structure, so as to reduce manufacturing cost, without diminishing its high precision fluid flow control in linear proportion to solenoid excitation current.

SUMMARY OF THE INVENTION

In accordance with the present invention, this objective is successfully achieved by means of a reduced mechanical complexity solenoid-driven valve control structure, in which a moveable, magnetic armature of a proportional solenoid assembly is positioned adjacent to one end of a fixed pole piece protruding from a solenoid bore and is supported by means of a compact suspension spring arrangement adjacent to the one end of the bore. The movable armature is configured to provide two radial magnetic flux paths. One flux path traverses a fixed radial shunt gap at one end of fixed magnetic pole piece that is located in and protrudes from the one end of the solenoid bore. The other flux path traverses a variable geometry reluctance gap defined between a radially projecting, tapered rim portion of the armature and an inwardly projecting tapered portion of the solenoid assembly housing.

The proportional solenoid assembly is mechanically coupled with a valve unit for electrically controlling its operation, in particular the flow of fluid between a fluid input port and a fluid exit port of the valve unit, in accordance with displacement of the movable armature along the solenoid assembly axis in proportion to current applied to the solenoid. The valve unit may be of the type employed in micro fluid flow control systems, which require precise regulation of the rate of fluid flow in extremely reduced volume fluid flow applications.

In accordance with a non-limiting configuration, the valve unit may comprise a base member having a longitudinal axis co-linear with a fluid input port into which fluid, the flow rate of which is to be regulated, is introduced, and a fluid exit port from which the fluid exits the valve unit. The input port of the base member opens into a first bore which terminates at a first side of an end wall; likewise, the output port opens into a second, generally cylindrical, threaded bore which terminates at a second side of the end wall. This end wall is solid with a valve seat at a floor portion of a generally cylindrical cavity that extends to a prescribed depth into the base member.

The valve seat is surrounded by and terminates a valve bore, which intersects the first bore, so as to provide a closeable fluid communication path between the fluid input port and the base member's generally cylindrical cavity. The valve seat is sized to be closed by a valve poppet, which is mechanically coupled to a movable armature, by means of an armature retainer, such that the poppet moves in concert with the movable armature. A further bore extends from the bottom of the base member cavity and intersects the second threaded bore adjacent to the second side of the end wall, so as to provide a fluid communication path between the cavity and the fluid exit port.

The valve unit further includes a generally hollow, cup-shaped valve body member which is threaded into a cylindrical sidewall of the base member and forms therewith an interior fluid flow chamber. The valve body member has a generally disc-shaped end wall through which an axial bore is formed, so as to provide communication with a recess on the opposite side of the disc-shaped end wall. An exterior sidewall portion of the valve body member receives an O-ring to provide a seal between the valve body member with the cylindrical base member.

The armature retainer is configured to receive a first suspension spring-retaining, cylindrical spacer, and has a flat rim portion which extends radially outwardly from a cylindrical wall portion. The armature retainer has a nose end which is threaded into a threaded axial bore of the magnetic armature. When so joined, the armature retainer and the movable armature capture interior radius portions of a pair of suspension springs, which adjoin and are mutually spaced apart by the spacer, between the magnetic armature and the flat rim portion of the armature retainer. The suspension springs support the axially translatable armature outside of end of the solenoid bore from which the fixed pole piece protrudes. The armature-supporting suspension springs are captured in a cylindrical recess at an end portion of a magnetic housing, such that both the suspension springs and the translatable armature are outside (axially displaced from the solenoid bore). This structural configuration of the invention reduces its mechanical complexity and facilitates assembly of its components compared to other proportional solenoid-controlled valve designs, such as those described above.

The nose end of the armature retainer, in addition to being externally threaded for attachment with the threaded bore of the movable armature, has a recess which receives a distal end of an armature-biasing axial pin that is captured within an axial bore of the shaft portion of a stationary, generally T-shaped magnetic pole piece. The armature-biasing axial pin provides an externally calibrated spring bias force to establish the amount of force required to translate the magnetic armature and its attached poppet away from the valve-closing position. The T-shaped magnetic pole piece closes one end and is supported by the housing.

To enable the armature and its suspension springs to be supported outside of the axial solenoid bore, the armature is configured to have a generally cylindrical shape, that includes a first, tubular body portion and a second, generally triangularly tapered, radially projecting rim portion, which surrounds and is solid with tubular body portion. The first tubular body portion has a threaded bore for receiving the nose portion of the armature retainer, as described above. The radially projecting, tapered rim portion of the movable armature terminates at a further tubular portion that has a cylindrical recess. This recess in the movable armature has an interior diameter that is slightly larger than that of a cylindrical end of the longitudinal shaft portion of the fixed magnetic pole piece protruding beyond the one end of the solenoid bore, to allow relative axial translation between the movable armature and the stationary magnetic pole piece (as the armature is axially translated in proportion to energization current applied to the solenoid winding). The further tubular portion of the armature provides a substantially constant, low reluctance radial magnetic shunt path between the cylindrical end of the fixed pole piece and the armature, irrespective of the relative axial separation between the bottom of the armature recess and the fixed pole piece.

The tapered, radially projecting rim portion of the movable armature is magnetically coupled with an associated tapered rim which projects inwardly from an interior ledge portion of the magnetic housing. Mutually opposing surfaces of the armature's tapered rim portion and the tapered rim portion of the housing create a varying geometry air gap between the two, during axial translation of the movable armature in response to energization current applied to the solenoid. This varying geometry air gap and the tapering thicknesses of the mutually opposed tapered rim portions of the magnetic armature and the housing cause the magnetic field characteristic between the armature and the housing to become saturated at each of the tapered rim portions.

As a result, the force imparted by solenoid on the movable armature varies in proportion to the current applied to the solenoid winding, whereby displacement of the armature against the bias spring varies in proportion to current. Since armature displacement is proportional to solenoid current, fluid flow through the valve unit resulting from the displacement of the poppet in concert with the axial displacement of the armature is proportional to the current applied to the solenoid.

The substantial reluctance provided by way of the axial air gap between the armature recess and the pole piece, the relatively small reluctance in the radial shunt path between the tubular portion of the armature and the end portion of the fixed pole piece, and the varying geometry gap between the tapered rim portions of the armature and housing effectively confine a major part of the magnetic flux through the armature in the radial direction, so as to by-pass the axial air gap between the armature and the fixed pole piece. Since the air gaps are outside the bore of the solenoid assembly, the need for a non-magnetic spacer is eliminated. (Normally, such a non-magnetic spacer must be welded to magnetic elements, which requires precision fixtures in the manufacturing process, in order to hold all of the non-magnetic and magnetic elements in coaxial alignment.)

The magnetic housing is welded to a lip portion of a generally hollow, cup-shaped valve body member. An annular recess is formed in the interior cylindrical wall of the housing adjacent its attachment to the valve body member. This recess captures a second spring-retaining, ferrule-shaped spacer and outer edge portions of the pair of suspension springs.

To facilitate assembly of the components and alignment of the fixed pole piece along the solenoid bore axis of the housing, a generally disc-shaped guide member is captured at an interior ledge portion of the housing. The guide member is sealed by O-rings with the pole piece shaft and the housing. An upper end of the housing has an annular ridge upon which a generally disc-shaped end portion of the T-shaped pole piece is captured, so that the longitudinal shaft portion of the fixed pole piece is coaxial with and passes through the aperture in the guide piece. The fixed T-shaped magnetic pole piece and the housing form a generally longitudinal annular cavity, which accommodates the solenoid winding. Electrical connection to the solenoid winding is by way of leads which extend through an aperture in the disc-shaped end portion of the pole piece.

To calibrate the solenoid actuator, an externally threaded cylindrical shaft member is threaded into the axial bore of the shaft portion of the pole piece. The shaft member has a nose portion which fits within a first end of a compression spring which has a second end captured upon the nose portion of armature-biasing pin. The extent to which the shaft member is threaded into the axial bore of the pole piece establishes an axially directed spring-bias against the magnetic armature and thereby a bias urged by the poppet against the valve seat. Once the shaft member has been rotated into the bore of the pole piece to establish the desired valve opening force, a lock nut may be tightened on an externally threaded end portion of the shaft member against the top surface of the disc-shaped pole piece, to prevent further rotation of shaft member.

DETAILED DESCRIPTION

Figure 1:
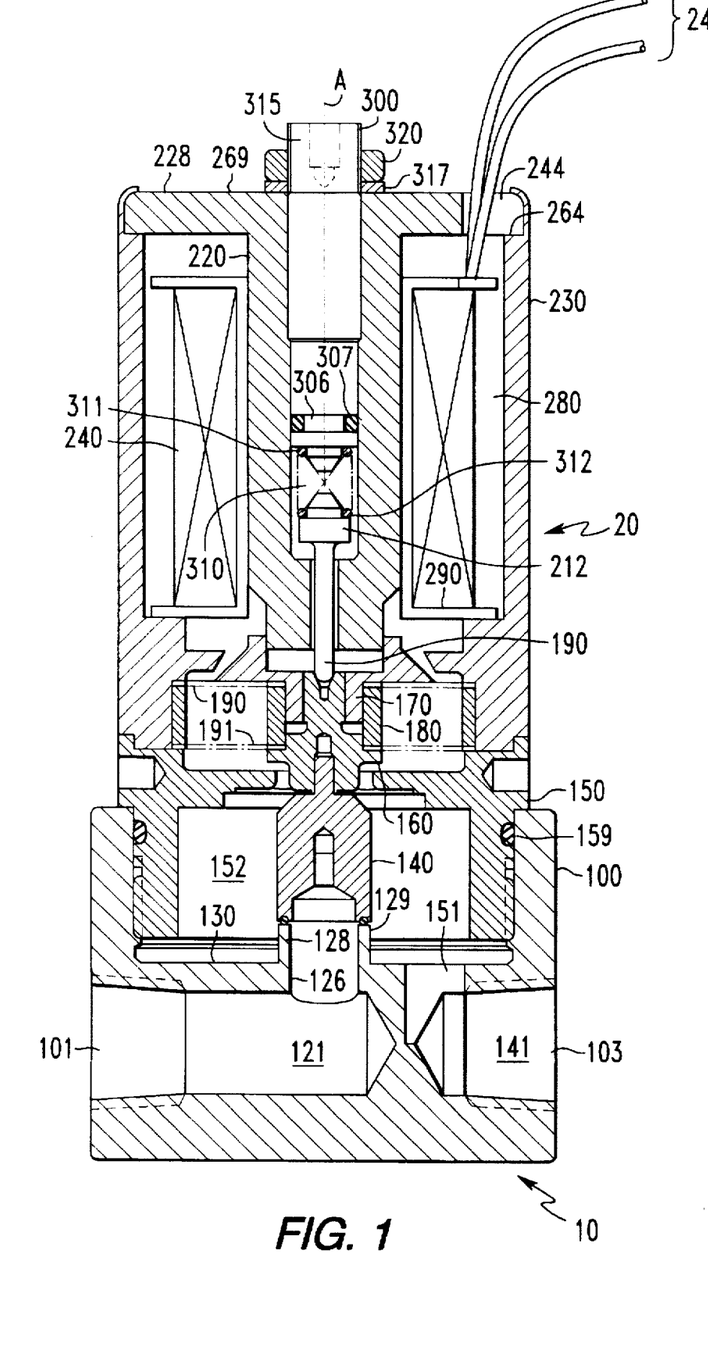
FIG. 1 is a longitudinal, cross-sectional diagrammatic illustration of a proportional solenoid-controlled fluid valve assembly embodying the present invention.
Figure 2:
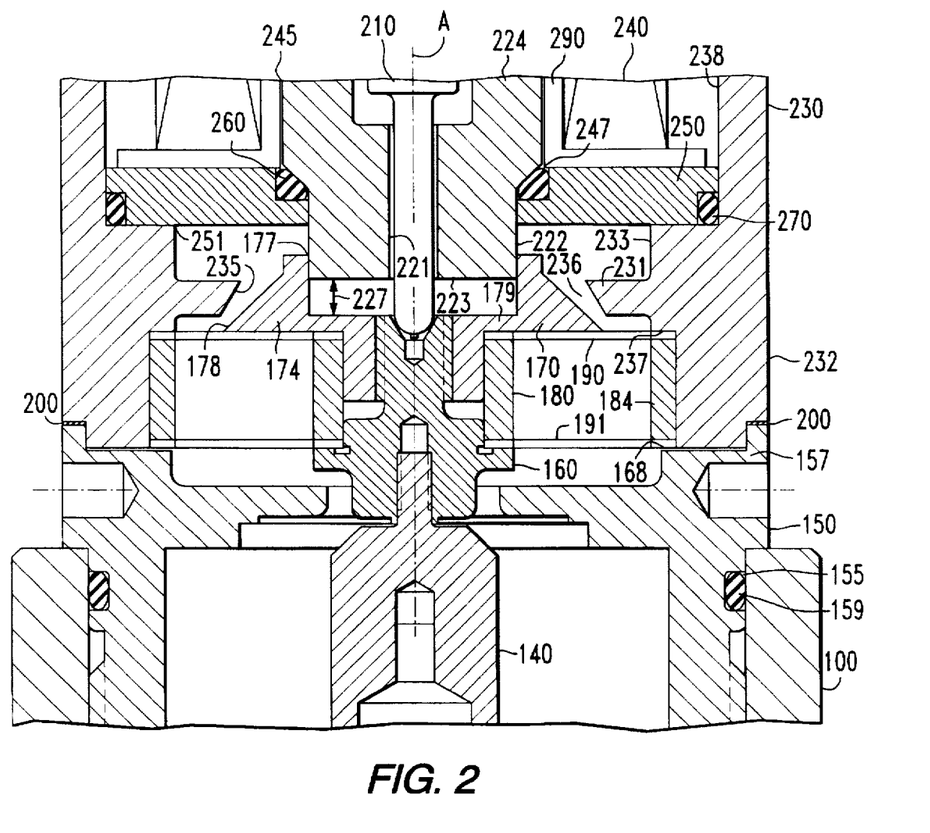
FIG. 2 is an enlarged view of a portion of FIG. 1.

Referring now to the drawings, FIG. 1 is a longitudinal, cross-sectional diagrammatic illustration of a proportional solenoid-controlled fluid valve assembly embodying the present invention, FIG. 2 is an enlarged view of a portion of FIG. 1, and FIGS. 3-15 are cross-sectional views of individual components. (In the description to follow, in order to avoid unnecessary cluttering of the drawings, FIGS. 1 and 2 are not labelled with all of the reference numerals that are employed in FIGS. 3-15, wherein individual components of FIG. 1 are labelled in detail. Unless otherwise indicated, the cross-sectional illustrations of the Figures are assumed to be taken along a plane containing a cylindrical axis of symmetry A.)

As illustrated in the diagrammatic assembled view of FIG. 1, the proportional solenoid-controlled fluid valve assembly of the present invention includes a valve unit 10 of non-magnetic material, such as stainless steel, and a solenoid unit 20, comprised of magnetic material such as magnetic steel, which is mechanically coupled with valve unit 10 for electrically controlling its operation, and therefore the flow of fluid between a fluid input port 101 and a fluid exit port 103.

The valve unit 10 comprises a generally cylindrical base member 100 (shown in detail in FIG. 3) having a longitudinal axis 102 that is co-linear with the fluid input port 101 into which fluid, the flow rate of which is to be regulated, is introduced at a first end 106 of the base member 100, and the fluid exit port 103 from which the fluid exits the valve unit 10. Fluid input port 101 and fluid exit port 103 may be internally threaded, as shown at 111 and 113, respectively, so that the valve unit 10 may be installed between respective sections of fluid transporting conduit, not shown.

Figure 3:
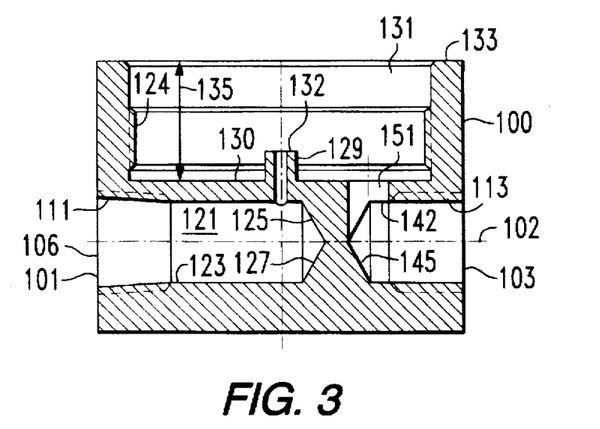
FIG. 3 is a cross-sectional view of a valve base member.
Figure 4:
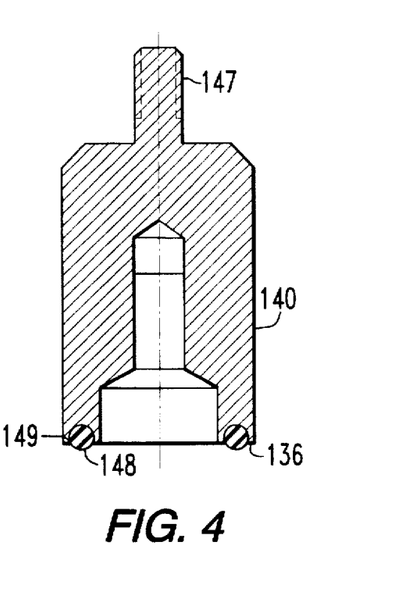
FIG. 4 is a cross-sectional view of a valve poppet.

Within cylindrical base member 100, the input port 101 opens into a first generally cylindrical bore 121, which is bounded by a cylindrical sidewall 123 and a first side 125 of an interior end wall 127. Similarly, output port 103 opens into a second, generally cylindrical bore 141, which is bounded by cylindrical sidewall 142 and terminates at a second side 145 of interior end wall 127. Interior end wall 127 is solid and terminates with a cylindrical valve seat 129 at the bottom 130 of a generally cylindrical cavity 131, that extends from a first end 133 to a prescribed depth 135 into the generally cylindrical base member 100. Valve seat 129 terminates a cylindrical valve bore wall 128, having a generally cylindrical bore 126 which intersects bore 121, so as to provide a closeable fluid communication path between fluid input port 101 and cavity 131. Valve seat 129 has a circular lip 132 that is sized to be closed by the terminal end 136 of a valve poppet 140, shown in detail in FIG. 4. An O-ring 148 may be captured in a circular recess 149 at the bottom, terminal end 136 of poppet 140. A generally cylindrical bore 151 extends from the bottom 130 of generally cylindrical cavity 131 and intersects bore 141 adjacent to the second side 145 of interior end wall 127, thereby providing a fluid communication path between generally cylindrical cavity 131 and fluid exit port 103.

Figures 5, 6:
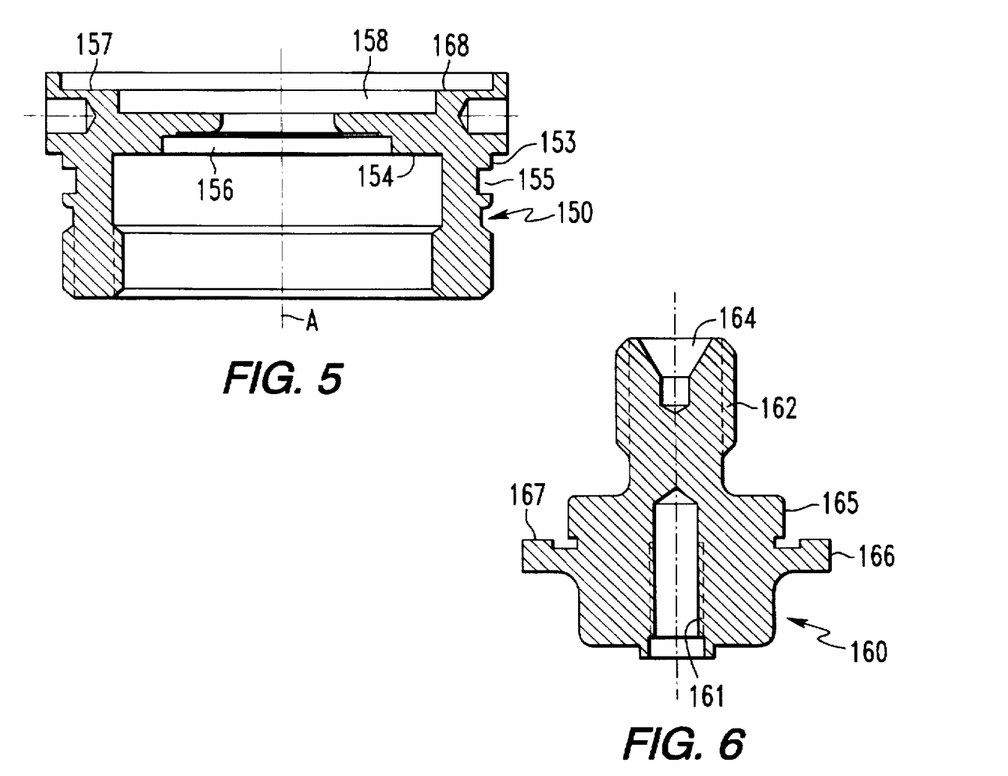
FIG. 5 is a cross-sectional view of a cup-shaped valve body member.
FIG. 6 is a cross-sectional view of an armature retainer.

The valve unit 10 further includes a generally hollow, cup-shaped valve body member 150, shown in detail in FIG. 5 and which is configured to be threaded into the threaded cylindrical sidewall 124 of cylindrical base member 100, so as to define an interior fluid flow chamber 152, to which bores 126 and 151 extend. Valve body member 150 has a generally disc-shaped end wall 154 having a stepped bore 156, which provides communication with a generally cylindrical recess 158 on the opposite side of end wall 154. An exterior sidewall portion 153 of valve body member 150 has a circular recess 155, which is sized to receive an O-ring 159, to provide a fluid-tight seal between valve body 150 and the cylindrical base member 100, when the two are screwed together. Stepped bore 156 is sized to accommodate axial translation of poppet 140, a threaded axial shaft portion 147 of which is sized to engage a threaded axial bore 161 of a generally cylindrically shaped armature retainer 160, shown in detail in FIG. 6.

Figure 7:
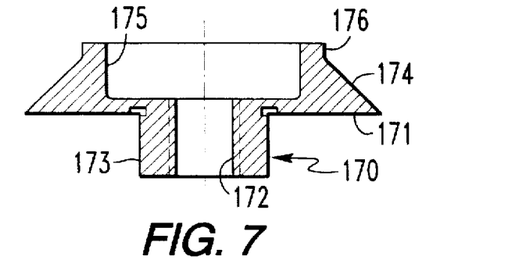
FIG. 7 is a cross-sectional view of a translatable, magnetic armature.
Figure 8:
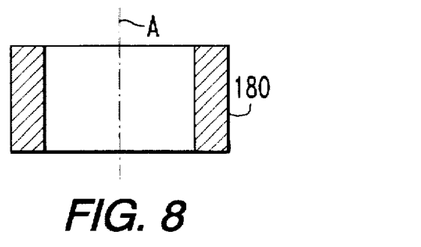
FIG. 8 is a cross-sectional view of an interior, spring-retaining, ferrule-shaped spacer.

Armature retainer 160 is shown in detail in FIG. 5 as having an externally threaded nose end 162, which is sized to be threaded into the interior bore 172 of a translatable, magnetic armature 170, shown in detail in FIG. 7. Armature retainer 160 further includes a cylindrical wall portion 165, which is sized to receive a spring-retaining, ferrule-shaped spacer 180, an individual one of which is shown in FIG. 8) and a flat, rim portion 166, which extends radially from and is solid with cylindrical wall portion 165. By threading nose end 162 of armature retainer 160 into the interior bore 172 of magnetic armature 170, first and second spiral-configured suspension springs 190 and 191 (shown in plan in FIG. 9) adjoining and mutually spaced apart by spacer 180, may be captured between a rear or lower face 171 of magnetic armature 170 and'a flat surface 167 of rim portion 166 of armature retainer 160.

Figure 10:
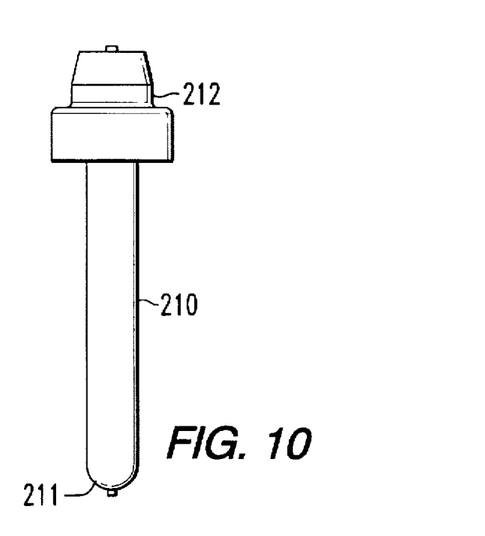
FIG. 10 is a diagrammatic side view of an armature-biasing axial pin.
Figure 11:
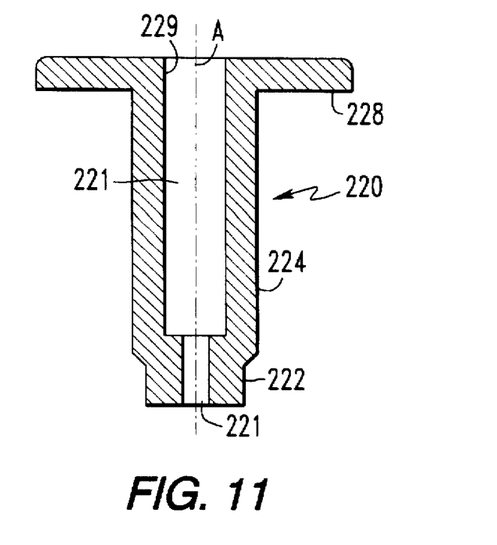
FIG. 11 is a cross-sectional view of a generally T-shaped magnetic pole piece.
Figure 12:
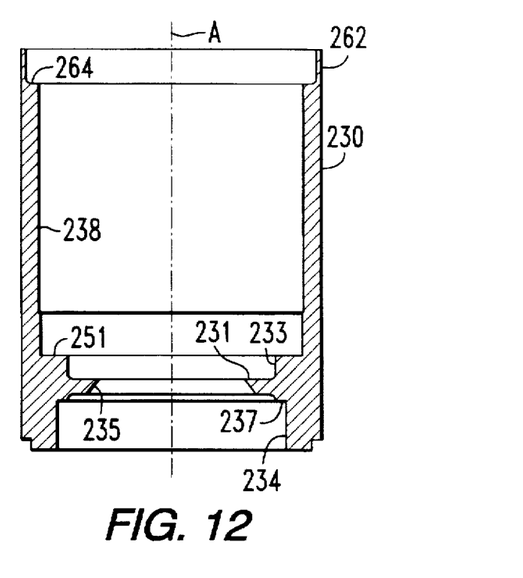
FIG. 12 is a cross-sectional view of a magnetic housing.
Figure 13:
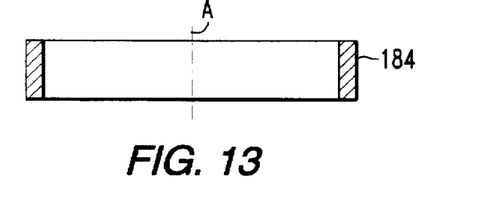
FIG. 13 is a cross-sectional view of a wide diameter spring-retaining, ferrule-shaped spacer.

The nose end 162 of armature retainer 160 has a recess 164, which is sized to accommodate a distal end 211 of an armature-biasing axial pin 210, shown in FIG. 10, which is located within an interior axial bore 221 of a fixed or stationary, generally T-shaped magnetic pole piece 220, shown in FIG. 11, supported with a generally cylindrical magnetic housing 230, shown in FIG. 12. As will be described, armature-biasing axial pin 210 provides an externally calibrated spring bias force along axis A against armature 170, so as to establish the amount of force required to translate armature away from its valve-closing position.

As shown in greater detail in FIG. 7, magnetic armature 170 has a generally cylindrical shape, including a first, tubular body portion 173 through which threaded interior bore 172 passes, and a second, generally triangularly tapered rim portion 174, which surrounds and is solid with tubular body portion 173. The tapered rim portion 174 of the magnetic armature 170 terminates at a tubular portion 176, within which a cylindrical recess 175 is formed. Recess 175 has an interior diameter that is slightly larger than that of an interior cylindrical end 222 of a longitudinal shaft portion 224 of fixed magnetic pole piece 220. The cylindrical end 222 of longitudinal shaft portion 224 protrudes from the lower end 247 of a bore 245 of a solenoid coil 240.

The slightly larger diameter of armature recess 175 allows relative axial translation between armature 170 and stationary magnetic pole piece 220, as the armature 170 is axially translated in proportion to energization current applied to solenoid coil 240, as will be described. Tubular portion 176 of magnetic armature 170 provides a substantially constant, low reluctance radial shunt gap 177 for radial lines of magnetic flux between the cylindrical end 222 of fixed magnetic pole piece 220 and the armature 170, irrespective of the relative axial separation 227 between the floor 179 of recess 175 and the end face 223 of pole piece 220.

Because the armature-supporting suspension springs 190 and 191 are captured at the end portion 232 of the housing 230, where a single weld joint 200 affixes the housing 230 to the valve body 150, both suspension springs 190 and 191 and the translatable magnetic armature 170 supported thereby are outside (axially displaced from the lower end of the solenoid bore from which the stationary pole piece 220 protrudes). This reduces the complexity of the solenoid actuator and facilitates assembly of its components (requiring only the single weld joint 200, as noted above) compared to other proportional solenoid-controlled valve designs, such as the solenoid actuator configuration detailed in the above-referenced Kumar Patent No. 4,954,799, in which assembly of the suspension spring-supported armature employs multiple precision weld joints for the suspension structure within the solenoid bore.

The tapered rim portion 174 of magnetic armature 170 is arranged to be magnetically coupled with a tapered rim portion 231 that projects inwardly from an interior ledge portion 233 of housing 230. As shown in the enlarged partial view of FIG. 2, the mutually opposing surfaces 178 and 235, respectively, of the armature's tapered rim portion 174 and the tapered rim portion 231 of housing 230, are tapered and have respectively different slopes, so as to create a varying geometry air gap 236 between the tapered rim portion 174 of armature 170 and the tapered rim portion 231 of housing 230, during relative axial translation between magnetic armature 170 and stationary magnetic pole piece 220, as the armature 170 is axially translated in response to energization current applied to a solenoid coil 240.

Because of this varying geometry air gap 236, and the reduced, non-constant (tapering) thicknesses of the mutually opposed tapered rim portions 174 and 231 of armature 170 and housing 230, respectively, the magnetic field characteristic between the armature and the housing becomes saturated at the tapered extremities or edges of the tapered rim portions 174 and 231. As a consequence, displacement of armature 170 and associated fluid flow through valve unit 10, as established by the axial displacement of the poppet relative to valve seat 129 in concert with the displacement of armature 170 varies in proportion to the current applied to the solenoid coil 240.

The substantial reluctance provided by way of the separation or axial air gap 227 between the bottom or floor 179 of armature recess 175 and the end face 223 of pole piece 220, in combination with the relatively low reluctance in the radial direction (due to the shunt path gap 177 between tubular portion 176 of armature 170 and the end portion 222 of pole piece 220, and the varying geometry gap 236 between the tapered rim portions 174 and 231) effectively confines magnetic flux in these regions, by-passing axial air gap 227.

As noted briefly above, having the air gaps outside the solenoid bore 245 obviates the need for a non-magnetic spacer, which is normally welded to magnetic elements and, in order to maintain all of the non-magnetic and magnetic elements in coaxial alignment during the manufacturing process, normally entails the use of precision fixtures.

As described, housing 230 has a first end portion 232 which is configured to engage and be attached to a lip portion 157 of generally hollow, cup-shaped valve body member 150. Attachment between the housing 230 and the valve body member may be effected by means of an electron beam weld at a housing-to-valve body member joint region, shown at 200. Advantageously, because of the use of a fixed pole piece, and the configuration of the movable armature and the location of the suspension spring arrangement, such a weld attachment is the only such attachment required in the solenoid assembly of the present invention, which reduces manufacturing complexity and cost.

Figure 9:
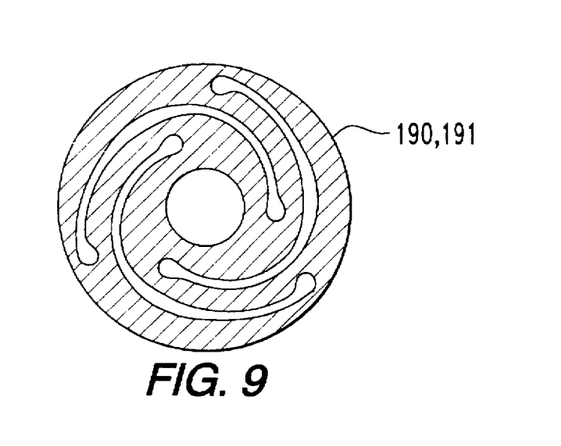
FIG. 9 is a plan view of a spiral-configured suspension spring.

More particularly, housing 230 has a cylindrical recess 234 between its first end portion 232 and its tapered rim portion 231. Recess 234 has a radius and axial length sized to receive and capture a second spring-retaining, ferrule-shaped spacer 184, shown in FIG. 13, together with outer edge portions 193 and 194 of respective flat suspension springs 190 and 191 (as shown in FIGS. 1, 2, and 9 ), between an upper surface 237 of recess 234 just beneath tapered rim portion 232 of housing 230 and a region 168 of lip portion 157 of cup-shaped valve body member 150. Namely, the diameter and axial length of recess 234 along the interior of the interior cylindrical wall of the housing 230 are such that both flat suspension springs 190 and 191 and their associated outer spacer 184 are securely captured in the recess 234, upon joining (e.g. welding) the first end portion 232 of the housing 230 to the lip portion 157 the valve body member 150.

Figure 14:
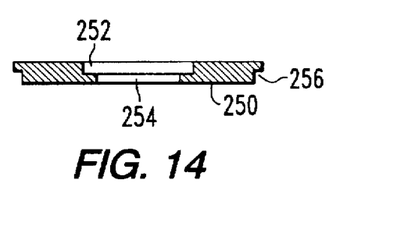
FIG. 14 is a cross-sectional view of a generally disc-shaped guide member.

To facilitate assembly of the components and coaxial alignment of pole piece 220 along axis A, a generally disc-shaped guide member 250, shown in FIG. 14, made of non-magnetic material, such as stainless steel, is sized to be captured at the upper surface 251 of interior ledge portion 233 of housing 230. Surrounding a central aperture 254 through which pole piece 220 passes, disc-shaped guide member 250 has a detent 252, which is sized to receive an O-ring 260 for providing a seal against pole piece 220. Guide member also has an outer edge detent 256, which is sized to receive an O-ring 270 for providing a seal against housing 230, where its ledge portion 233 adjoins its interior cylindrical wall surface 238.

An upper end 262 of housing 230 has an annular ridge 264, upon which a generally disc-shaped end portion 228 of T-shaped pole piece 220 is captured, so that the longitudinal shaft portion 224 of pole piece 220 extends coaxial with axis A and passes through aperture 254 in guide piece 250, as described above. When pole piece 220 is so inserted, a generally longitudinal annular cavity 280 is provided between the shaft portion 224 of pole piece 220 and the interior cylindrical wall surface 238 of housing 230. This generally longitudinal annular cavity 280 receives a bobbin 290 upon which solenoid winding 240 is wound. Electrical connection to solenoid coil 240 is provided by way of leads 242 which extend through an aperture 244 in the disc-shaped end portion 228 of pole piece 220 for attachment to a current control source, not shown.

Figure 15:
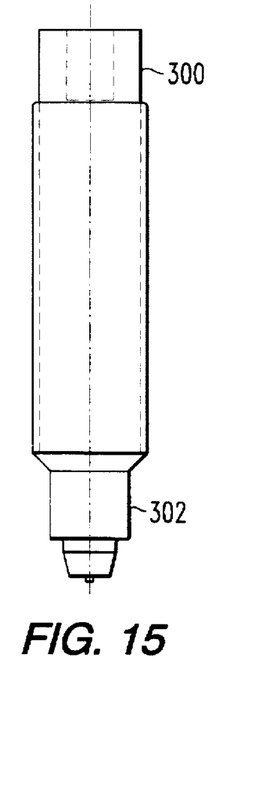
FIG. 15 is a diagrammatic side view of an externally threaded cylindrical shaft member.

In order to calibrate the solenoid actuator, namely, calibrate the amount of force required to axially translate armature 170 along axis A, in a direction away from the valve unit 10, where poppet 140 is urged against and closes the valve seat 129, an externally threaded cylindrical shaft member 300, shown in FIG. 15, having a nose portion 302, is threaded into a threaded portion 229 of the axial bore 221 of the shaft portion 224 of pole piece 220. As shown in FIG. 1, the nose portion 302 of shaft member 300 may have a circular recess 306, in which an O-ring 307 is captured, to seal the interior bore 221 of pole piece 220.

The nose portion 302 of shaft member is sized to fit within a first end 311 of a compression spring 310, which has a second end 312 captured upon the nose portion 212 of armature-biasing pin 210. The degree to which shaft member 300 is threaded into axial bore 221 of pole piece 220 establishes an axially directed spring-bias against armature 170, and thereby against the valve seat 129 by poppet 140. A lock nut 320 may be threaded onto an externally threaded end portion 315 of shaft member 300 and against a washer 317 at the top surface 269 of disc-shaped pole piece 220, so as to prevent further rotation of shaft member 300, once shaft member 300 has been rotated in bore 221 of pole piece 220 to establish the desired valve opening force.

In operation, with the solenoid actuator calibrated by rotation of the shaft member 300 in the manner described above, fluid flow between fluid input port 101 and fluid exit port 103 is established by controlling the displacement of the poppet 140 relative to valve seat 129, in accordance with the energization of the solenoid winding 240. With a fluid supply coupled to input port 101, translating poppet 140 away from its closure position against valve seat 129 allows the fluid to enter fluid flow chamber 152 of valve body 150, and flow therefrom through bore 151 to outlet bore and fluid exit port 103.

When the solenoid 140 is energized, the magnetic flux of the resulting magnetic field follows a closed path through pole piece 220, translatable armature 170 and housing 230. As described above, the magnetic flux path through armature 170 comprises two portions: 1—the radial shunt path portion across the low reluctance gap 177 between the cylindrical wall portion of the cylindrical end 222 of the fixed magnetic pole piece 220 and the tubular portion 176 of armature 170; and 2—the varying geometry gap 236 between the differentially tapered, mutually opposing surfaces 178 and 235, respectively, of the tapered rim portion 174 of armature 170 and the tapered rim portion 231 of housing 230. The substantial magnetic reluctance of axial air gap 227 between the bottom 179 of armature recess 175 and the end face 223 of pole piece 220, does not effectively contribute to the flux path.

As pointed out above, the combination of the varying geometry air gap 236 and the reduced, non-constant (tapering) thicknesses of the mutually opposed tapered rim portions 174 and 231 of armature 170 and housing 230, respectively, cause the magnetic field characteristic between the armature 170 and the housing 230 to become saturated within the tapered edges of the tapered rim portions 174 and 231. This magnetic field characteristic causes the axial displacement of armature 170 and therefore poppet 140, which establishes fluid flow through valve unit 10, to be proportional to the energization current applied to the solenoid winding 240.

Thus, through a combination of reduced complexity components, including a uniquely configured moveable, magnetic armature that provides two radial magnetic flux paths—one which traverses a fixed radial shunt gap at one end of the fixed magnetic pole piece and the other which traverses a variable geometry reluctance gap defined between a radially projecting, tapered rim portion of the armature and an inwardly projecting tapered portion of the solenoid assembly housing, and a compact suspension spring arrangement adjacent to the one end of the bore, the present invention is able to satisfy the objective of reducing manufacturing complexity and cost of a proportional solenoid-controlled valve assembly of the type described in my above-referenced patent, without diminishing its high precision fluid flow control in proportion to solenoid excitation current.

As noted above, the varying geometry air gap and the reduced, non-constant (tapering) thicknesses of the mutually opposed tapered rim portions of the armature and the housing causes the magnetic field characteristic between the armature and the housing to become saturated at the tapered extremities of the tapered rim portions, whereby fluid flow through the valve unit as established by the axial displacement of the poppet relative to the valve seat in concert with displacement of armature varies in proportion to the current applied to the solenoid coil.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A solenoid-controlled valve assembly comprising:

a proportional solenoid controller including a housing containing a solenoid coil having a longitudinal axis and a bore coaxial therewith, for producing a magnetic field, said housing containing magnetic material for providing a flux path for said magnetic field, and including a projection portion which projects toward an interior portion of said housing, a magnetic pole piece disposed within and protruding from the bore of said solenoid coil, and a movable armature of magnetic material, supported for translation relative to said magnetic pole piece and having a body portion configured to be translatable relative to and be magnetically coupled with said magnetic pole piece, with a low magnetic reluctance radial gap provided between said movable armature and said magnetic pole piece, said movable armature including a rim portion which projects from said body portion toward and is magnetically coupled with said projection portion of said housing, said rim portion of said movable armature and said projection portion of said housing being configured, such that relative axial translation between said movable armature and said magnetic pole piece causes a variation in the geometry of a gap between said rim portion of said movable armature and said projection portion of said housing; and wherein said body portion of said movable armature is spaced apart from an end portion of said magnetic pole piece by an axial gap that is sufficiently large as to minimize an axial magnetic flux path between said movable armature and said magnetic pole piece and to effectively confine magnetic flux between said movable armature and said magnetic pole piece in said radial magnetic flux shunt path and in said variable geometry gap between said rim portion of said movable armature and said projection portion of said housing; and a valve unit, mechanically coupled with the movable armature of said proportional solenoid controller and being operative to regulate fluid flow between a fluid input port and a fluid exit port.

2. A solenoid-controlled valve assembly according to claim 1, wherein said body portion of said movable armature has a recess which is sized to accommodate an end portion of said magnetic pole piece.

3. A solenoid-controlled valve assembly according to claim 1, wherein said rim portion of said movable armature has a first tapered surface which projects toward and is magnetically coupled with a second tapered surface of said projection portion of said housing, such that relative axial translation between said movable armature and said magnetic pole piece causes a variation in the spacing of said first and second tapered surfaces between said rim portion of said movable armature and said projection portion of said housing.

4. A solenoid-controlled valve assembly according to claim 1, wherein an axial gap is provided between said movable armature and said magnetic pole piece exclusive of said solenoid bore, and wherein said movable armature is supported for axial translation relative to said magnetic pole piece by means of a flat suspension spring arrangement mounted at a location outside said solenoid bore.

5. A solenoid-controlled valve assembly according to claim 3, wherein said tapered rim portion of said magnetic armature terminates at a tubular portion within which a recess is formed, said recess having an interior diameter larger than that of an interior cylindrical end of said magnetic pole piece.

6. A solenoid-controlled valve assembly according to claim 3, wherein said valve unit comprises a base member having a fluid cavity coupled in fluid communication with said fluid input and fluid exit ports and containing a valve seat, which is closed by a valve poppet that is coupled with said magnetic armature.

7. A solenoid-controlled valve assembly according to claim 6, further including an armature retainer which is attached to said magnetic armature and is configured to couple said poppet to said magnetic armature.

8. A solenoid-controlled valve assembly according to claim 7, further including an armature-biasing axial pin which is captured within an interior axial bore of said magnetic pole piece and imparts a bias force to establish the amount of force required to translate said armature away from a valve-closing position.

9. A solenoid-controlled valve assembly according to claim 3, wherein said magnetic armature has a generally cylindrical shape, including a first body portion through which a threaded interior bore passes, and a second tapered rim portion which surrounds and is solid with said body portion, said tapered rim portion of said magnetic armature terminating at a body within which a recess is formed, said recess having an interior diameter that is slightly larger than that of an end of said magnetic pole piece which protrudes from said solenoid bore.

10. A solenoid-controlled valve assembly according to claim 4, wherein said suspension spring arrangement comprises a pair of spaced apart flat suspension springs supported by said housing at a location outside of and adjacent to an end of said solenoid bore, from which said pole piece protrudes.

11. A solenoid-controlled valve assembly according to claim 1, wherein said armature is configured such that when said solenoid is energized, magnetic flux of the resulting magnetic field follows a closed path through said pole piece, said armature and said housing and comprises a radial shunt path portion across said low magnetic reluctance radial gap between said magnetic pole piece and said armature, and said buriable geometry gap between mutually opposing surfaces of said tapered rim portion of said armature said tapered rim portion of said housing.

12. A solenoid-controlled valve assembly according to claim 4, wherein said housing has a first end portion which is configured to engage said valve unit and a recess adjacent to said first end portion of said housing, which is configured to receive and capture said flat suspension spring arrangement.

13. A solenoid-controlled valve assembly according to claim 1, wherein said rim portion of said armature projecting from said body portion and said projection portion of said housing are configured such that displacement of said armature as a result of the application of energization current to said solenoid causes fluid flow through said valve unit to vary in proportion to said energization current.

14. A solenoid-controlled valve assembly according to claim 3, wherein said first tapered surface of said rim portion of said movable armature has a first slope that is different from a second slope of said second tapered surface of said projection portion of said housing.

15. A proportional solenoid assembly comprising:
a housing containing magnetic material and supporting a solenoid having a bore and being operative to produce a magnetic field in response to the application of an electrical current thereto, and including a projection toward an interior of said housing;
a magnetic pole piece disposed within and protruding from an end of said solenoid bore; and
a movable magnetic armature supported outside said end of said solenoid bore, being translatable relative to said magnetic pole piece and having a body portion magnetically coupled by way of a low magnetic reluctance radial gap with said magnetic pole piece, said movable magnetic armature including a radial rim which projects from said body portion toward and is magnetically coupled with said projection of said housing, said radial rim of said movable armature and said projection of said housing being configured such that relative axial movement between said movable armature and said magnetic pole piece causes a variation in the geometry of a variable geometry gap between said radial rim of said movable armature and said projection of said housing; and wherein
said movable armature is spaced apart from an end of said magnetic pole piece by an axial gap that is sufficiently large as to minimize an axial magnetic flux path between said movable armature and said pole piece and to confine magnetic flux between said movable armature and said pole piece in said radial magnetic flux shunt path and in said variable geometry gap between said radial rim of said movable armature and said projection of said housing.

16. A proportional solenoid assembly according to claim 15, wherein said body portion of said movable armature has a recess which is sized to accommodate said magnetic pole piece.

17. A proportional solenoid assembly according to claim 15, wherein said radial rim of said movable armature has a first tapered surface which projects toward and is magnetically coupled with a second tapered surface of said projection of said housing, such that relative axial translation between said movable armature and said magnetic pole piece causes a variation in the spacing of said first and second tapered surfaces between said radial rim of said movable armature and said projection of said housing.

18. A proportional solenoid assembly according to claim 15, wherein an axial gap is provided between said movable armature and said magnetic pole piece exclusive of said solenoid bore and said movable armature is supported for axial translation relative to said magnetic pole piece by means of a flat suspension spring arrangement mounted in said housing at a location outside said end of said solenoid bore.

19. A proportional solenoid assembly according to claim 17, wherein said tapered radial rim of said magnetic armature terminates at a surface of said body portion of said magnetic armature within which a recess is formed, said recess having an interior diameter larger than that of said end of said magnetic pole piece.

20. A proportional solenoid assembly according to claim 18, further including an armature retainer which is attached to said magnetic armature and which, in cooperation with said armature captures an interior region of said suspension spring arrangement.

21. A proportional solenoid assembly according to claim 20, wherein said flat suspension spring arrangement comprises a pair of spaced apart flat suspension springs supported by said housing at a location outside of and adjacent to an end of said solenoid bore, from which said pole piece protrudes.

22. A proportional solenoid assembly according to claim 17, wherein said movable armature is configured such that when said solenoid is energized, magnetic flux of the resulting magnetic field follows a closed path through said pole piece, said movable armature and said housing, and includes a radial shunt path across said low magnetic reluctance radial gap between said magnetic pole piece and said movable armature, and said buriable geometry magnetic flux gap between mutually opposing surfaces of said tapered radial rim of said armature said tapered projection of said housing.

23. A proportional solenoid assembly according to claim 21, wherein said housing has a first end portion which includes a recess adjacent thereto, said recess being configured to receive and capture said flat suspension spring arrangement.

24. A proportional solenoid assembly according to claim 17, wherein said first tapered surface of said radial rim of said movable armature has a first slope that is different from a second slope of said second tapered surface of said projection of said housing.

25. A proportional solenoid assembly comprising:
a magnetic housing supporting a solenoid having a bore, and being operative to produce a magnetic field in response to application of a current thereto, and including a radial projection toward an interior of said housing;

a magnetic pole piece fixed within and protruding from an end of said solenoid bore; and a moveable, magnetic armature positioned adjacent to one end of said fixed magnetic pole piece protruding from said solenoid bore and being supported by a suspension spring arrangement adjacent to said one end of said fixed magnetic pole piece for axial movement relative to said fixed magnetic pole piece, said movable armature being configured to provide a first low reluctance radial magnetic flux path, which traverses a fixed radial shunt gap at said one end of said fixed magnetic pole piece, and having a radial rim, which provides a second magnetic flux path traversing a variable geometry reluctance gap defined between said radial rim projecting from said armature and said radial projection of said housing; and wherein said moveable, magnetic armature is axially spaced apart from said one end of said magnetic pole piece by an axial gap that is sufficiently large as to minimize an axial magnetic flux path between said movable armature and said pole piece and to effectively confine magnetic flux between said movable armature and said pole piece in said first radial magnetic flux shunt path and in said second variable geometry gap between said radial rim of said movable armature and said projection of said housing.

26. A proportional solenoid assembly according to claim 25, wherein said movable, magnetic armature has a recess sized to accommodate said fixed magnetic pole piece.

27. A proportional solenoid assembly according to claim 25, wherein said radial rim of said movable, magnetic armature has a first tapered surface which projects toward and is magnetically coupled with a second tapered surface of said projection of said housing, such that relative axial translation between said movable armature and said magnetic pole piece causes a variation in the spacing of said first and second tapered surfaces between said radial rim of said movable armature and said projection of said housing.

28. A proportional solenoid assembly according to claim 27, wherein said tapered radial rim of said magnetic armature terminates at a surface of said movable, magnetic armature within which a recess is formed, said recess having an interior diameter larger than that of said end of said magnetic pole piece.

29. A proportional solenoid assembly according to claim 28, further including an armature coupling element which is attached to said magnetic armature and which, in cooperation with said movable, magnetic armature, captures said suspension spring arrangement.

30. A proportional solenoid assembly according to claim 25, wherein said suspension spring arrangement comprises a pair of spaced apart flat suspension springs supported by said housing at a location outside of and adjacent to an end of said solenoid bore, from which said pole piece protrudes.

31. A proportional solenoid assembly according to claim 25, wherein said movable armature is configured such that when said solenoid is energized, magnetic flux of the resulting magnetic field follows a closed path through said pole piece, said movable armature and said housing, and includes said first low reluctance radial magnetic flux path across said fixed radial shunt gap between said magnetic pole piece and said movable armature, and said variable geometry magnetic reluctance gap between mutually opposing surfaces of said radial rim of said armature and said radial projection of said housing.

32. A proportional solenoid assembly according to claim 25, wherein said housing has a first end portion which includes a recess adjacent thereto, said recess in said housing being configured to receive and capture said suspension spring arrangement.

33. A proportional solenoid assembly according to claim 27, wherein said first tapered surface of said radial rim of said movable, magnetic armature has a first slope that is different from a second slope of said second tapered surface of said radial projection of said housing.

* * * * *